(12) United States Patent
Lenzing et al.

(10) Patent No.: US 6,619,114 B1
(45) Date of Patent: Sep. 16, 2003

(54) DEVICE FOR MEASURING AT LEAST ONE PARAMETER OF A MEDIUM FLOWING IN A LINE

(75) Inventors: Thomas Lenzing, Benningen (DE); Klaus Reymann, Gerlingen (DE); Dieter Tank, deceased, late of Kornwestheim (DE), by Anke Fleischer, heir; Uwe Konzelmann, Asperg (DE); Waldemar Guenther, Bietigheim-Bissingen (DE); Horst Kubitz, Steinheim/Murr (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/831,154
(22) PCT Filed: Sep. 5, 2000
(86) PCT No.: PCT/DE00/03050
§ 371 (c)(1), (2), (4) Date: Dec. 11, 2001
(87) PCT Pub. No.: WO01/18499
PCT Pub. Date: Mar. 15, 2001

(30) Foreign Application Priority Data

Sep. 7, 1999 (DE) .......................................... 199 42 502

(51) Int. Cl.$^7$ ................................................ G01F 1/68
(52) U.S. Cl. .................................. 73/202.5; 73/204.21
(58) Field of Search ................................. 73/202, 202.5, 73/204.21, 204.22

(56) References Cited

U.S. PATENT DOCUMENTS

| | | | | | |
|---|---|---|---|---|---|
| 4,214,988 | A | * | 7/1980 | Naffziger | 15/21.1 |
| 4,433,576 | A | * | 2/1984 | Shih et al. | 73/204.21 |
| 4,569,323 | A | * | 2/1986 | Okumura | 123/41.86 |
| 4,571,996 | A | * | 2/1986 | Wakeman et al. | 73/202.5 |
| 4,697,462 | A | * | 10/1987 | Daube et al. | 55/528 |
| 4,839,038 | A | * | 6/1989 | McLain, II | 73/202 |
| 4,982,602 | A | * | 1/1991 | Stiefel et al. | 73/202.5 |
| 5,546,794 | A | * | 8/1996 | Kuhn et al. | 73/118.2 |

* cited by examiner

Primary Examiner—Harshad Patel
(74) Attorney, Agent, or Firm—Ronald E. Greigg

(57) ABSTRACT

The invention relates to a device for measuring at least one parameter of the intake air mass flow of an internal combustion engine. Fluid particles contained in the line act on a measuring element and influence a characteristic curve behavior of the measuring element used to determine parameters of the flowing medium. In order to reduce the action of fluid on the measuring element, the measuring element is disposed in a line or a tubular body, downstream of a protective screen, which deflects the medium flow and deflects the fluid particles. Downstream of the protective screen, longitudinal ribs, a suction opening, or a turbulence generator reduce the release of uncontrolled eddies.

35 Claims, 7 Drawing Sheets

DEVICE FOR MEASURING AT LEAST ONE PARAMETER OF A MEDIUM FLOWING IN A LINE

CROSS-REFERENCE TO RELATED APPLICATIONS

This application is a 35 USC 371 application of PCT/DE00/03050 filed on Sep. 5, 2000.

BACKGROUND OF THE INVENTION

1. Field of the Invention

The invention is based on a device for measuring at least one parameter of a medium flowing in a line, and more particularly to a device for measuring the air intake mass flow of an internal combustion engine.

2. Description of the Prior Art

DE 197 35 891 A1 has disclosed a measuring body that can be inserted into a flow of an intake line of an internal combustion engine to measure the mass of intake air, which device has flow conduit and a measurement conduit, which is essentially inclined in relation to a longitudinal axis of a line and is part of an adjoining S-shaped deflection conduit. A measuring element is disposed in the measurement conduit. The measuring element can be embodied as a micromechanical sensor part with a dielectric membrane, as has been disclosed, for example, by DE 43 38 891 A1 and U.S. Pat. No. 5,452,610. The penetration of water into the intake line, for example because the road is wet with rain, can contaminate the measuring element. Natural amounts of dissolved salts contained in this water vapor then cause a drift in the characteristic curve due to the buildup of salt encrustation on the membrane of the sensor part. A protected region is in fact produced by the inclination of the measuring body, but dirt particles or fluid particles get into the measurement conduit anyway.

DE 197 35 664 A1 has already disclosed a device in which the measuring element is disposed inside a tubular body that the medium flows through in which an upstream end of the tubular body extends into a filter chamber and has inlet openings there on a circumference surface in order to reduce the action of dirt particles or water droplets on the measuring element. Particularly with severely contaminated air and a high water content in the intake air of the internal combustion engine, there is the danger that the air filter will become laden with water which then penetrates the filter mat and thereby carries dirt particles along with it. On the downstream side of the air filter, the actually clean side, there is now the danger that the intake air will once again carry along dirt particles and water droplets from the filter surface which will then be undesirably deposited on the measuring element and lead to incorrect measurements or to a failure of the measuring element. Through the placement of inlet openings on the circumference surface, the tubular body according to the prior art does in fact reduce the danger of deposits on the measuring element, but this long an embodiment of the tubular body causes an undesirable pressure drop which leads to a reduction of the measurement sensitivity. Moreover, the reduction of the exposure of the measuring element to fluid/solid particles is insufficient to meet the requirements for a fluid input of 20 liter/hour.

The suggestion has also been made to use a deflecting screen in a line in order to separate out fluid particles from flowing air or from a flowing gas. A deflecting screen of this kind, which is connected upstream of an inner tube or in the line, influences the air/water mixture flowing toward the measuring element in such a way that the fluid particles are conveyed against a tube wall or a line wall, while the air remains in a center of the inner tube. However, this phase separation then produces a very large non-stationary dead water region directly downstream of the deflecting screen, which fills up with water during the operation and then permits this water to flow uncontrollably in the direction of the measuring body. In addition, eddies of air from the dead water region also travel randomly to the measuring body and thus interfere with the reproducibility of the sensor signal.

DE 196 52 753 A1 has disclosed a device with a measuring element which contains a flow rectifier and a screen for stabilizing a measurement signal. However, no additional screen or element is used to protect the measuring element from fluids or solid particles.

DE 196 47 081 A1 and U.S. Pat. No. 5,918,279 have disclosed a screen which in different areas, has screen openings with different cross-sections. However, no steps are taken there to prevent a contamination of the measuring element with water and/or solid particles.

SUMMARY OF THE INVENTION

The device according to the invention has the advantage over the prior art that an improvement of the measurement results is achieved in a simple manner by virtue of the fact that fluids and/or solid particles are deflected around a measuring element by a protective screen.

It is particularly advantageous to reduce the production of a dead water region and an eddy zone through means disposed downstream of the protective screen or in the protective screen.

One advantageous embodiment for reducing a dead water region is comprised of longitudinal ribs which extend axially in the direction of the dead water region and become thicker in the main flow direction. This produces a greater wall surface area and friction so that a flow speed in the dead water region is reduced and consequently, the dead water region is significantly reduced in size. This leads to a behavior that is constant over time and to reduced signal noise of a measuring element.

It is also advantageous to aspirate the water contained in the dead water region away from this region. This takes place by means of at least one suction opening let into the tubular body in the vicinity of the dead water region. Projections produce an acceleration of the flow in the vicinity of the suction openings.

It is advantageous to embody the protective screen as a turbulence generator in order to reduce an accumulation of water in the dead water region because the flow is forced to spin, which pushes the water more forcefully against an inner wall of the line or the tubular body.

For an integral embodiment, it is advantageous to accommodate the protective screen as a turbulence generator in a recess of the measuring body; there can also be longitudinal ribs and suction openings in a measurement conduit of the measuring body.

It is also advantageous to use a tubular body in a line which contains a measuring body since the tubular body already reduces the contamination by solid and fluid particles.

It is also advantageous to insert the protective screen into the tubular body, which leads to a further significant reduction of the contamination by solid and fluid particles because the flowing medium is deflected.

One possibility for deflecting dirt particles and fluid droplets in the desired direction is advantageously produced when the protective screen extends inclined in relation to flow direction.

In order to reduce the number of parts and the cost of manufacturing, it is advantageous to integrate the protective screen into a flow rectifier disposed upstream of the measuring body.

BRIEF DESCRIPTION OF THE DRAWINGS

Other features and advantages of the invention will become apparent from the description contained below, taken with the drawings, in which.

DESCRIPTION OF THE PREFERRED EMBODIMENTS

Figure 1:
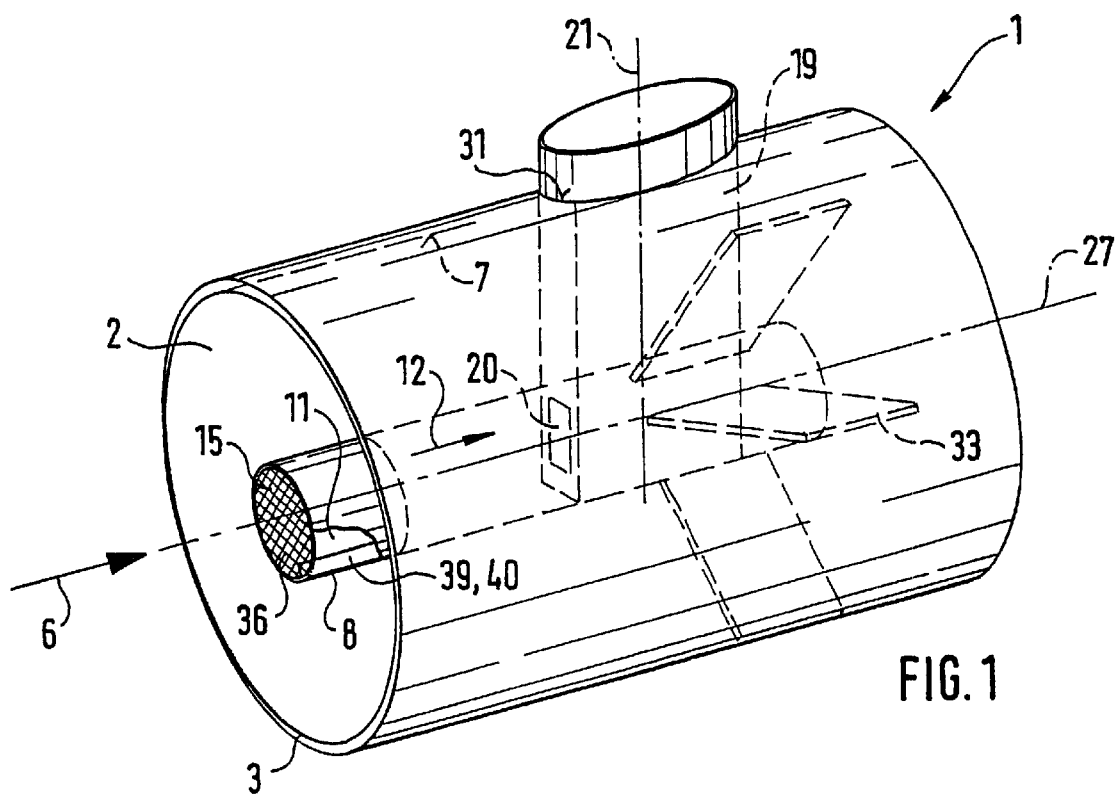
FIG. 1 shows an example of a device according to the invention, with a tubular body and longitudinal rib.

FIG. 1 shows a device 1 for measuring at least one parameter, in particular the air mass flow of a medium flowing in a line 2, in particular the intake air mass of an internal combustion engine. Parameters of a flowing medium include, for example, the air mass flow for determining an air mass, a temperature, a pressure, or a flow speed which can be determined by means of suitable sensors. It is possible to use the device 1 to measure other parameters. The line 2 has a wall 3. In the line 2, the medium flows in a main flow direction 6 indicated by an arrow. The line 2 has an inner wall 7. In the line 2, there is a tubular body 8 which extends, for example, spaced radially apart from the line 2, and which the medium circulates around. The tubular body 8 has a through flow conduit 11 and a protective screen 15 disposed in the vicinity of its upstream end. The protective screen 15 can, for example, be embodied as a wire mesh or as a plate-shaped grating. Any other form is also possible. Plastic, metal, ceramic, or glass can be used as the material for the protective screen 15, either for the wire mesh or for the plate-shaped protective screen 15. The plate-shaped protective screen 15 made of plastic can be produced, for example, by means of injection molding or by producing the screen openings 44 by means of a material-removing process. The plate-shaped grating screen 15 can be made of metal, for example sheet metal, by means of stamping, erosion, drilling, etc.

A flow direction 12 prevails downstream in the through flow conduit 11 at some distance from the protective screen 15. The flow direction 12 runs approximately parallel to the main flow direction 6. The line 2 has a center line 27 which is, for example, also the center line of the tubular body 8.

A measuring body 19, for example, extends in the tubular body 8. The measuring body 19 can, for example, be a temperature sensor as disclosed by DE 42 28 484 C2, a pressure sensor as disclosed by DE 31 35 794 A1, or an air mass sensor which determines the corresponding parameter. As an example for the various sensors, an air mass sensor has been selected here by way of example, which is disposed, for example, in a measuring body 19 and, for example, has an inlet opening 20 into which the medium flows.

A measuring body 19 of this kind is known to the specialist from DE 197 35 891 A1 and is incorporated into this disclosure.

The air mass aspirated by the internal combustion engine can be changed at will by means of a throttle valve, not shown, disposed downstream of the tubular body 8 in the intake tube of the engine.

In order to determine the intake air mass of the internal combustion engine, the measuring body 19 is provided, which is embodied as essentially oblong and block-shaped and extends along a longitudinal axis 21. The longitudinal axis 21 extends essentially perpendicular to the center line 27 and therefore also to the main flow direction 6. The measuring body 19 is partially inserted through an insertion opening 31 in the wall 3 and an insertion opening 22 in a wall of the tubular body 8, for example, and protrudes with a free end into the through flow conduit 11. A connector end of the measuring body 19 that contains the electrical connections, for example in the form of connector tabs, thereby remains, for example, outside the line 2. In a known manner, the measuring body 19 contains a measuring element 23 which remains in contact with the air flowing through the through flow conduit 11 and determines the air mass aspirated by the internal combustion engine. In a known manner, the measuring element 23 can be embodied in the form of at least one temperature-dependent resistor. In particular, it is possible to embody the measuring element 23, as has been disclosed for example by DE 43 38 891 A1 and U.S. Pat. No. 5,452,610, as a micromechanical component with a dielectric membrane, on which resistance elements are embodied. It is also conceivable to insert the measuring element 23 into the line 2 or the tubular body 8 without the measuring body.

At least two struts 33, for example, are disposed on the tubular body 8, which serve to secure the tubular body 8 in the line 2. In addition to securing the tubular body 8 in the air flow between the line 2 and the tubular body 8, the struts 33 intensify the pressure drop so that the air quantity flowing through the through flow conduit 11 increases and also, the struts 33 produce a desirable rectification of the intake air flow. The tubular body 8 can also be disposed in the line 2 without struts 33, for example by being fastened to the measuring body 19.

The protective screen 15 is comprised, for example, of slats 36 disposed perpendicular to one another, for example perpendicular to the longitudinal axis 21 and parallel to longitudinal axis 21, wherein the slats 36 perpendicular to the longitudinal axis 21 are set, for example, at an angle of approximately 30°. This changes the main flow direction 6 downstream of the protective screen 15. The protective screen 15 can also extend inclined in relation to the main flow direction 6.

Dirt particles and fluid droplets adhere to the protective screen 15 and are conveyed toward an inner wall 7 of the line 2 or of the tubular body 8 and as a result, move past the inlet opening 20 of the measuring body 19 or past the measuring element 23.

Further downstream of the protective screen 15, a flow direction 12 prevails in the through flow conduit 11, which is virtually parallel to the center line of the tubular body 8.

Figure 2A:
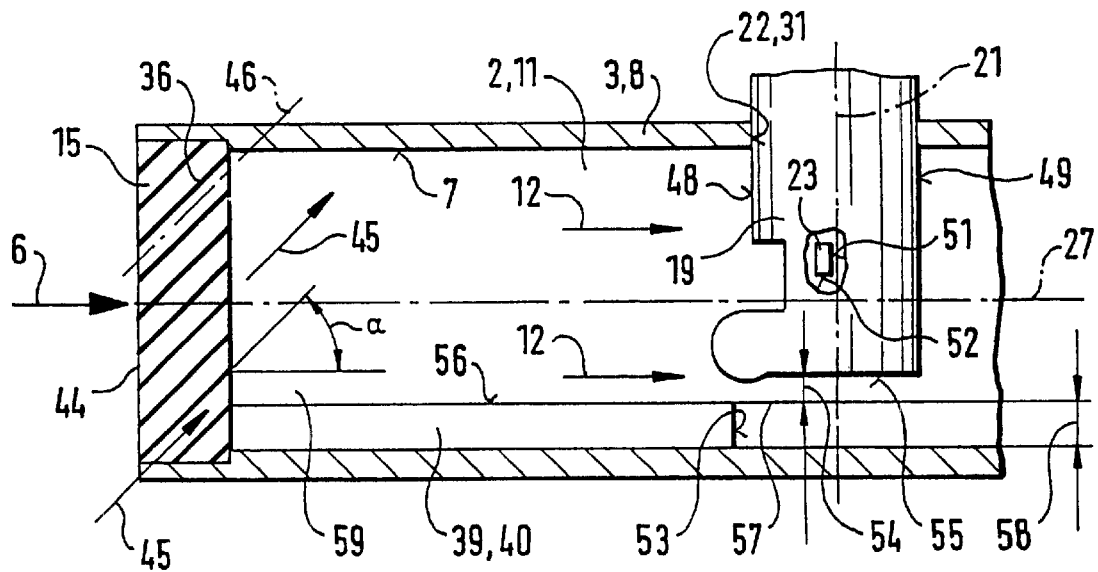
FIG. 2 is an axial cross section in the longitudinal direction of FIG. 1.
Figure 2B:
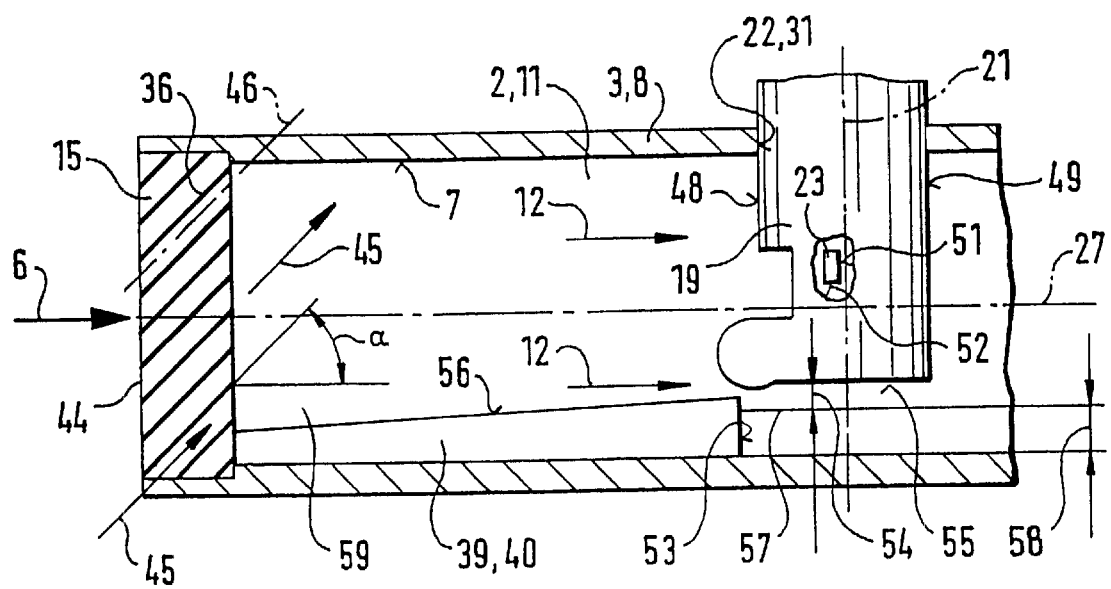
Figure 2C:
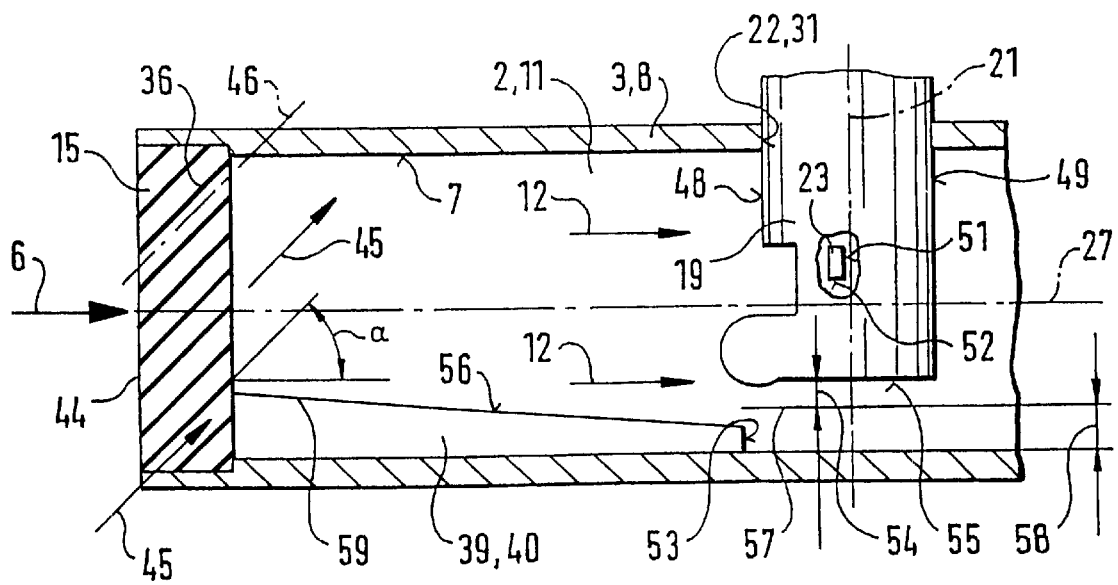

Downstream of the protective screen 15, a protected region 59 is produced, as shown in FIG. 2, which can fill up with fluid over a long period of operation of the device 1. This fluid then flows uncontrollably toward the measuring body 19 or the measuring element 23 at random times. In addition, eddies of air 87 (FIG. 5) from the protected region 59 travel into the inlet opening 20 and as a result, interfere with sensor signal reproducibility.

Figure 5:
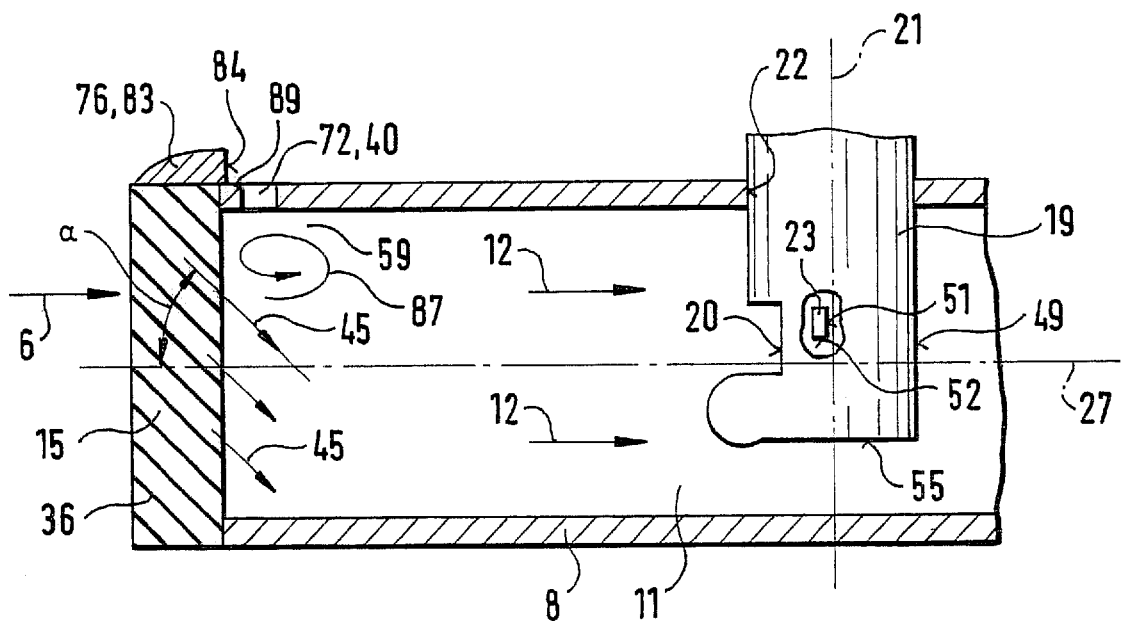
FIG. 5 is an axial cross section in the longitudinal direction of FIG. 4.

The tubular body 8 is provided, for example, with at least one longitudinal rib 39 extending in the direction of the center line. The longitudinal ribs 39, which are for example directly downstream of the protective screen 15, are distributed over the circumference of the tubular body 8 as a means 40 for reducing eddies 87 and uncontrollable fluid accumulations (FIG. 5).

FIG. 2 shows an axial cross section in the longitudinal direction of FIG. 1. Parts which are the same or function in the same manner are provided with the same reference numerals as in FIG. 1.

The protective screen 15 is shown, with slats 36 that extend inclined at a particular deflection angle a in relation to the center line 27. The slats 36 form protective screen openings 44, which have a longitudinal axis 46.

The medium flows through the protective screen openings 44 and is deflected in a different direction 45 indicated by an arrow downstream of the protective screen 15. The direction 45 approximately encloses the deflection angle a with the main flow direction 6.

For example, there can also be no tubular body 8 provided so that the protective screen 15 extends, for example, over the entire cross section of the line 2 and the at least one longitudinal rib 39 is disposed against the inner wall 7 of the line 2.

The at least one longitudinal rib 39 adjoins the protective screen 15, for example directly.

The measuring body 19 has a front surface 48 which the medium strikes first before flowing around it. A lower surface 55 is constituted by the free radial end of the measuring body 19. The at least one longitudinal rib 39 here extends, for example, to the front surface 48 of the measuring body 19. However, it can also extend to a rear surface 49, which is disposed opposite the front surface 48 of the measuring body 19 at the downstream end. Instead of the front surface 48, rear surface 49, and bottom surface 55 of the measuring body 19, these can also be a front surface 50, rear surface 51, and bottom surface 52 of the measuring element 23.

A radial height 58 of the at least one longitudinal rib 39 is for example uniform in this instance. At most, the longitudinal rib 39 extends in the radial direction until a line 57, which is tangential to a radial end 56 of the longitudinal rib 39, at most touches a bottom surface 55 of the measuring body 19.

It is also conceivable for the radial height 58 to get larger or smaller starting from the protective screen 15, or for it to assume any other course.

If the radial height 58 of the longitudinal rib 39 varies, then at its downstream end 53 viewed from the free radial end, the longitudinal rib 39 has a radial distance 54 from the bottom surface 55 of the measuring body 19 that is greater than or equal to zero.

The protected region 59 is disposed downstream of the protective screen 15. This region is disposed approximately in the region that is not flowed through directly by the medium flowing in the direction 45. A so-called dead water region forms there, in which water collects on the upper surface of the protective screen and uncontrollable eddies 87 (FIG. 5) are generated.

The reduction of fluid accumulations and eddies 87 as well as the production of a chronologically constant flow behavior of these accumulations and eddies is produced as a result of the additional wall surface area 60 made available to the flow by means of the at least one longitudinal rib 39 and consequently, produces an increased wall adhesion and reduced flow speed. Thus the at least one longitudinal rib 39 does not interfere with the deflection of fluid, since it does not have any geometrically uneven areas in the flow direction and consequently does not change the fluid wall film produced, nor does it consequentially reduce the free flow cross section, so that hardly any pressure decrease occurs.

Figure 3:
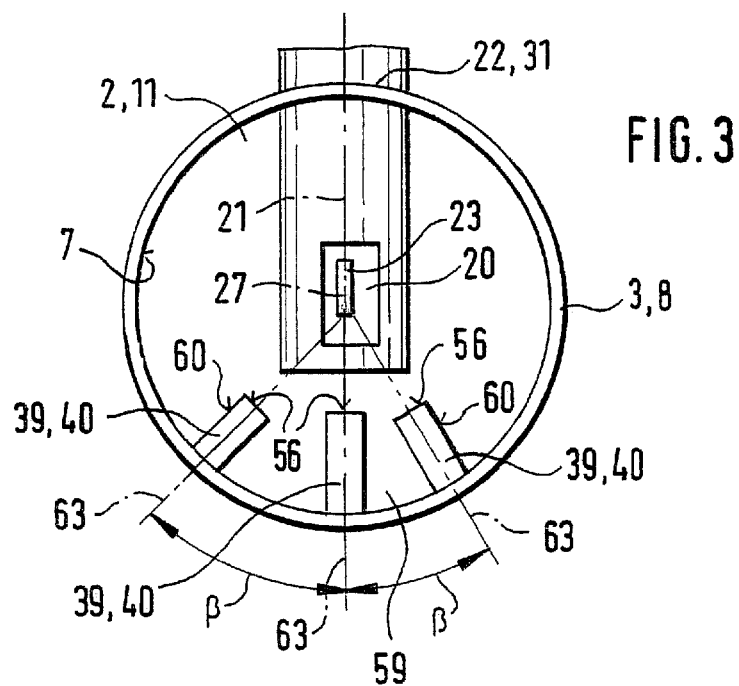
FIG. 3 is a top view of FIG. 1 in the main flow direction.

FIG. 3 shows a top view of FIG. 1 in the main flow direction 6. Parts which are the same or function in the same manner have been provided with the same reference numerals as in the preceding FIGS.

The explanations made with regard to FIG. 2 apply here as well: the at least one longitudinal rib 39 is disposed in the line 2 or in the through flow conduit 11.

The for example three longitudinal ribs 39 have rib center lines 63 which are aligned with a center point, i.e. an intersection point of the longitudinal axis 27 in the plane of the drawing. The rib center lines 63 intersect the center line 27. The at least one longitudinal rib 39 is thus radially aligned. The rib center lines 63 of directly adjacent longitudinal ribs 39 enclose, for example, a uniform intersecting angle a in relation to one another.

However, a uniform intersecting angle a is not required. The at least one longitudinal rib 39 can be disposed arbitrarily along an inner wall of the line 2 or of the tubular body 8. Preferably, the at least one longitudinal rib 39 is disposed in the same zone as the protected region 59.

To further stabilize the flow and consequently to increase the reproducibility of the sensor signal, the at least one longitudinal rib 39 can be embodied as wider perpendicular to the main flow direction 6 and can be embodied, for example, as streamlined, as a result of which on the one hand, it does not interfere with the water deflection, but on the other hand, blocks a greater cross sectional area and consequently accelerates the flow. A cross sectional contour of the at least one longitudinal rib 39 can be angular, curved, or round. A radial end 56 of the at least one longitudinal rib 39 can be round or flat.

Figure 4:
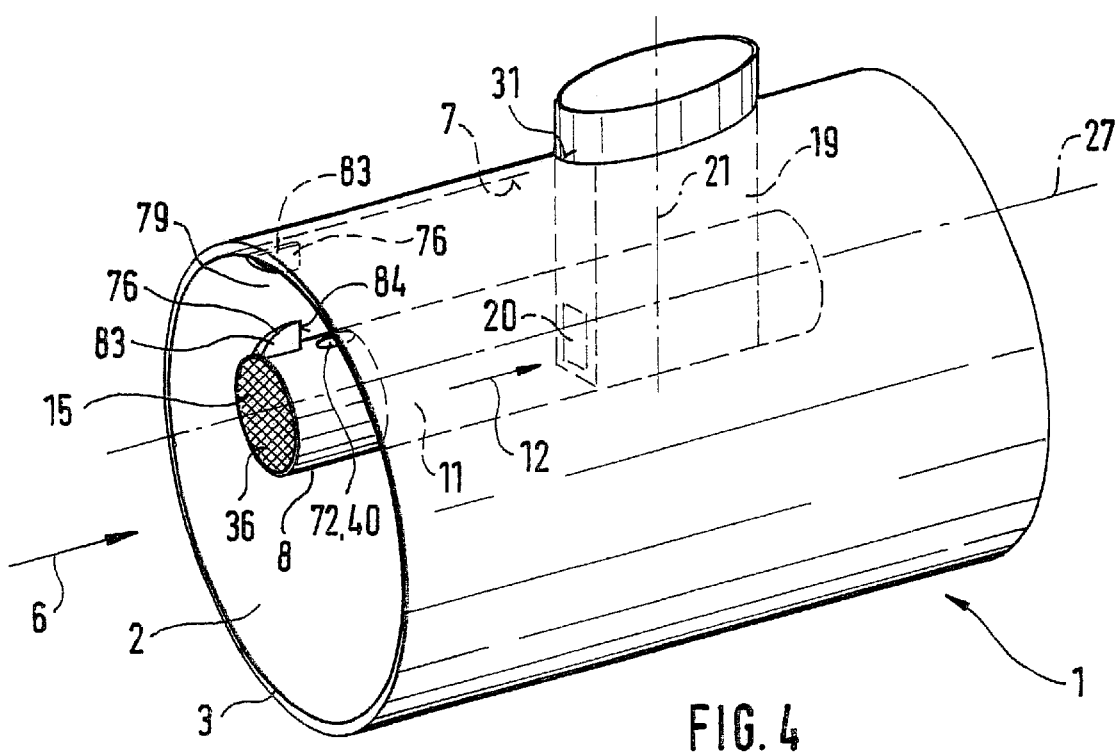
FIG. 4 shows another example of a device according to the invention, with a tubular body and a suction opening.

FIG. 4 shows another example of the device 1 according to the invention, with a tubular body 8 and a suction opening 72 as a means 40 for reducing eddies 87 (FIG. 5) and uncontrollable fluid accumulations. Parts which are the same or which function in the same manner are given the same reference numerals as in the preceding Figs.

At least one suction opening 72 is let into the tubular body 8 and is disposed downstream of the protective screen 15 in terms of the main flow direction 6. One or for example several openings 72 can be provided at any point of the tubular body 8. The at least one suction opening 72 can be embodied in any arbitrary form (round, angular, or oval), but should not exceed a diameter of 3 mm or a corresponding cross section. The suction opening 72 produces a connection between the line 2 and the protected region 59.

Upstream of the at least one suction opening 72, there is a means 76 for increasing a flow speed. This means is constituted, for example, by projections 83 on an outside of the tubular body 8 oriented toward the inner wall 7 of the line 2 and/or, for example, directed toward the opposite inner wall 7 of the line 2. For example, the projections 83 are rounded and their cross sections approximate quarter circles whose sharp rear edge 84 ends just before the at least one suction opening 72. Any other form which produces an acceleration of the flow in the vicinity of the suction opening 72 is conceivable. The projections 83 thus produce a locally convergent conduit 79 in the course of the main flow direction 6.

FIG. 5 shows an axial cross section in the longitudinal direction in FIG. 4. Parts which are the same or which function in the same manner are provided with the same reference numerals as in the preceding FIGS.

The arrows 45 indicate which direction the medium passing through the protective screen 15 is moving in when it emerges from the protective screen 15. Inevitably, a flow direction of the medium then realigns itself rapidly with the center line 27 of the tubular body 8. This produces a protected region 59 in which fluid, e.g. water, collects and uncontrollable eddies 87 are produced. The at least one suction opening 72 is preferably disposed in the vicinity of the protected region 59. A maximal distance of the at least one suction opening 72 from the protective screen 15 depends on the deflection angle α. The greater the deflection angle α is, the smaller the maximal distance should be.

An aspiration of the water through the at least one suction opening 72 is made possible by a pressure difference between the through flow conduit 11 and the line 2. To this end, it is necessary to produce such a pressure difference. This takes place, for example, by means of increasing the flow speed on the side of the tubular body 8 oriented toward the line 2 locally in the vicinity of the at least one suction opening 72 by accelerating the flow in the axial direction by means of the convergent conduit 79. The decrease in the interfering fluid accumulation in the protected region 59 and prevention of the uncontrollable flow of fluid toward the inlet opening 20 occur because the fluid otherwise collecting in the vicinity of the suction opening 72 does not generally travel further into the tubular body.

Figure 6:
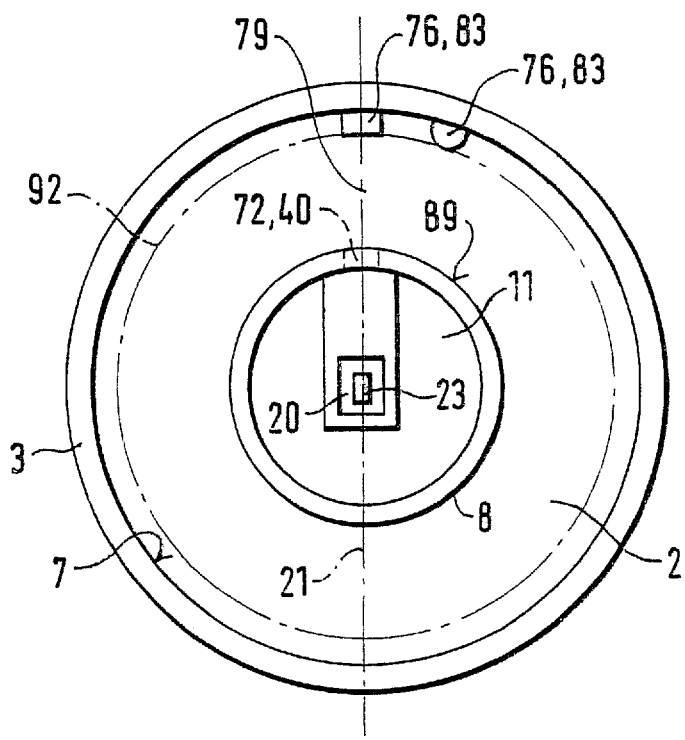
FIG. 6 is a top view of FIG. 4 in the main flow direction.

FIG. 6 shows a top view of FIG. 4 in the main flow direction 6. Parts which are the same or which function in the same manner are provided with the same reference numerals as in the preceding Figs.

The projection 83 can also be embodied only on the inner wall of the line 2 or only on an outer wall 89 of the tubular body 8, or on the outer wall 89 and the inner wall 7 of the line 2. The projection 83 can be embodied locally in the vicinity of a suction opening 72 or, as shown with the dashed line 92, can also be embodied around the entire inner wall of the line 2. Viewed in the main flow direction 6, the projection 83 can, for example, have an angular or round cross section.

Figure 7:
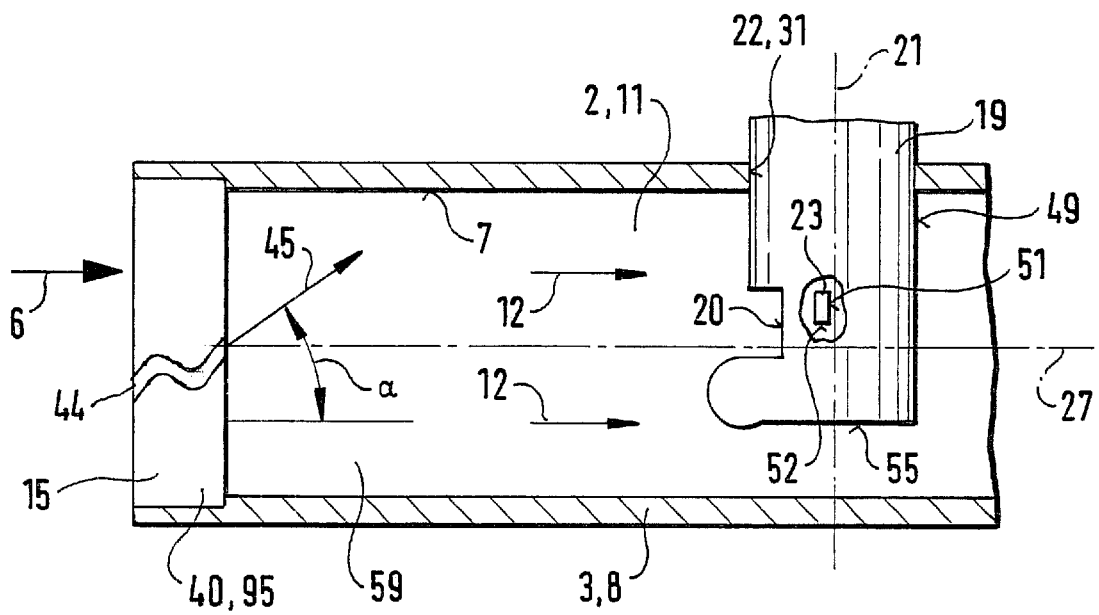
FIG. 7 is another exemplary embodiment according to the invention of a device according to the invention.

FIG. 7 shows another exemplary embodiment according to the invention of the device 1. Parts which are the same or which function in the same manner are provided with the same reference numerals as in the preceding FIGS.

The protective screen 15 is now embodied as a turbulence generator 95 and thus serves as a means 40 for reducing eddies 87 and uncontrollable fluid accumulations.

The screen openings 44 of the turbulence generator 95 are blades rotated in a rotationally symmetrically fashion and thus impart a spin to the flow. This spin generally stabilizes the flow in the through flow conduit 11, significantly reduces the fluid accumulation in the protected region 59, and consequently increases the reproducibility of the sensor signal. Imparting a rotation on the flow produces significantly higher centrifugal components in comparison to the non-spinning flow, as a result of which the fluid is deflected even more strongly against the inner wall 7 of the line 2 or of the tubular body 8.

The manufacture of the turbulence generator 95, for example out of plastic, takes place in a fashion identical to that of the prior manufacturing process, by means of plastic injection molding and by means of a molding tool with a core. The core is the negative of the protective screen and is removed from the molding tool by means of a rotating motion so that the turbulence generator is produced in the deformable plastic. The rotating motion upon removal of the core can be produced by coupling the core to a thread.

Figure 8A:
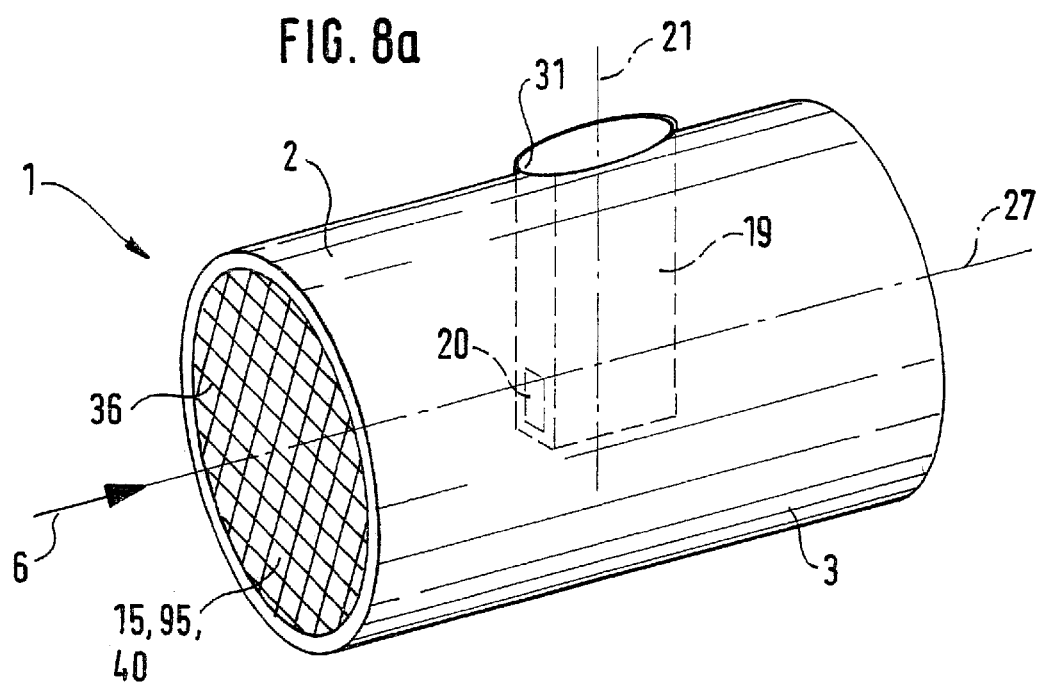
FIGS. 8a & 8b show possible dispositions of a protective screen.
Figure 8B:
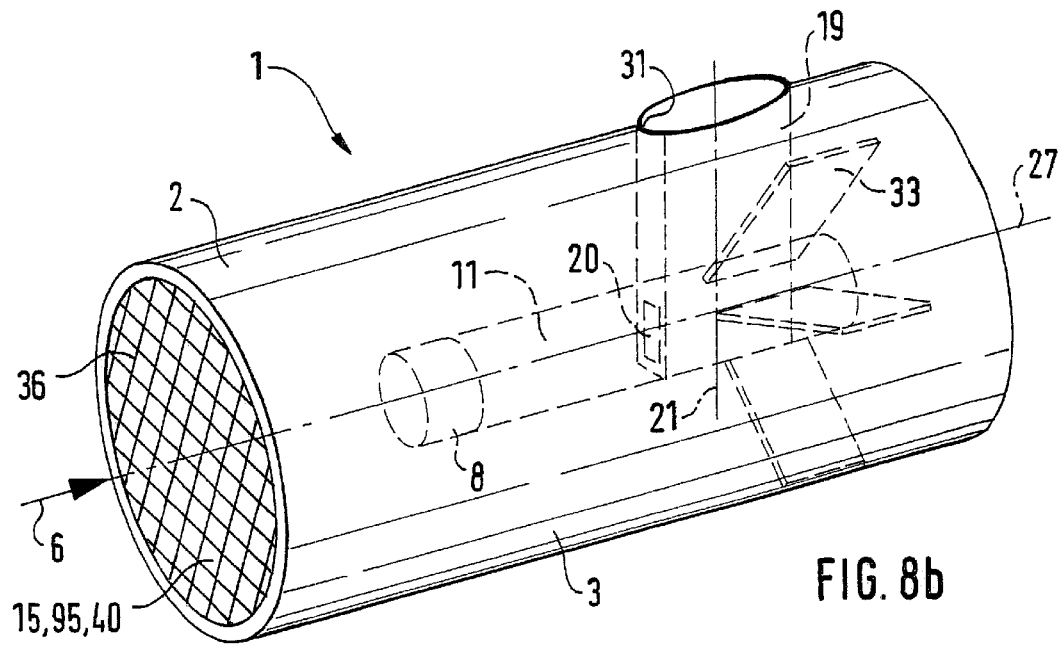

FIGS. 8a and 8b show possible dispositions of the protective screen 15, 95. Parts which are the same or which function in the same manner are provided with the same reference numerals as in the preceding Figures.

In FIG. 8a, the protective screen 15 embodied, for example, in the form of a turbulence generator 95 is affixed in the line 2 and extends, for example, over the entire cross section of the line 2. Furthermore, based on the embodiment according to FIG. 8a, the tubular body 8 can be affixed in the line 2 without a protective screen 95 (FIG. 8b). Another possibility is to affix the protective screen 95 only to the existing tubular body 8, as already shown in FIG. 1. Based on the example from FIG. 1, another possibility is to attach a second protective screen 15, 95, for example inside the line 2.

The protective screen 15, 95 or the protective screens 15, 95 in FIGS. 1–8 deflect the flow by a particular deflection angle α. As a result, the for example flat protective screen 15, 95 can be disposed perpendicular to the longitudinal axis 27 and the screen openings 44 are inclined in relation to the center line 27 of the line 2 by the deflection angle α. However, the screen openings 44 can also extend perpendicular to a longitudinal axis of the protective screen 15, 95 and the protective screen 15, 95 is set at a particular deflection angle α in relation to the longitudinal axis 27 so that the flowing medium is likewise deflected. As a result, dirt particles and fluid droplets are deposited on the protective screen 15 and conveyed to a downstream end of the protective screen in order to reach the inner wall of the line 2 or the tubular body 8 and to be conveyed past the measuring element 23 or the inlet opening.

It is also conceivable for the protective screen 15, 95 to have regions which deflect the flowing medium in different directions, for example toward opposing inner walls of the line 2 or the tubular body 8. As a result, two different flow directions are produced downstream of the protective screen 15, 95 and a protected region 59 is produced between them. This protected region 59 can in turn be influenced by longitudinal ribs 39 placed there in an appropriate manner.

Furthermore, the protective screen 15, 95 does not have to extend over the entire cross section of the line 2 or the tubular body 8.

Between a downstream end of the protective screen 15 and an inner wall of the line 2 or the tubular body 8, an open suction opening can be provided in the radial direction, as a result of which, the fluid that possibly contains dirt particles which is captured by the protective screen 15 travels into a wall region of the line 2 or the tubular body 8 and is carried downstream by the flowing air while maintaining an adhesion to the wall.

For example upstream of the measuring body 19 or the measuring element 23, the protective screen 15, 95 can be integrated into a ring, for example, which contains a flow rectifier for the medium flowing in the line 2 so that the flow rectifier and the protective screen are installed in the line 2 simultaneously with the ring, as described, for example, in DE 196 52 753 A1.

Figure 9:
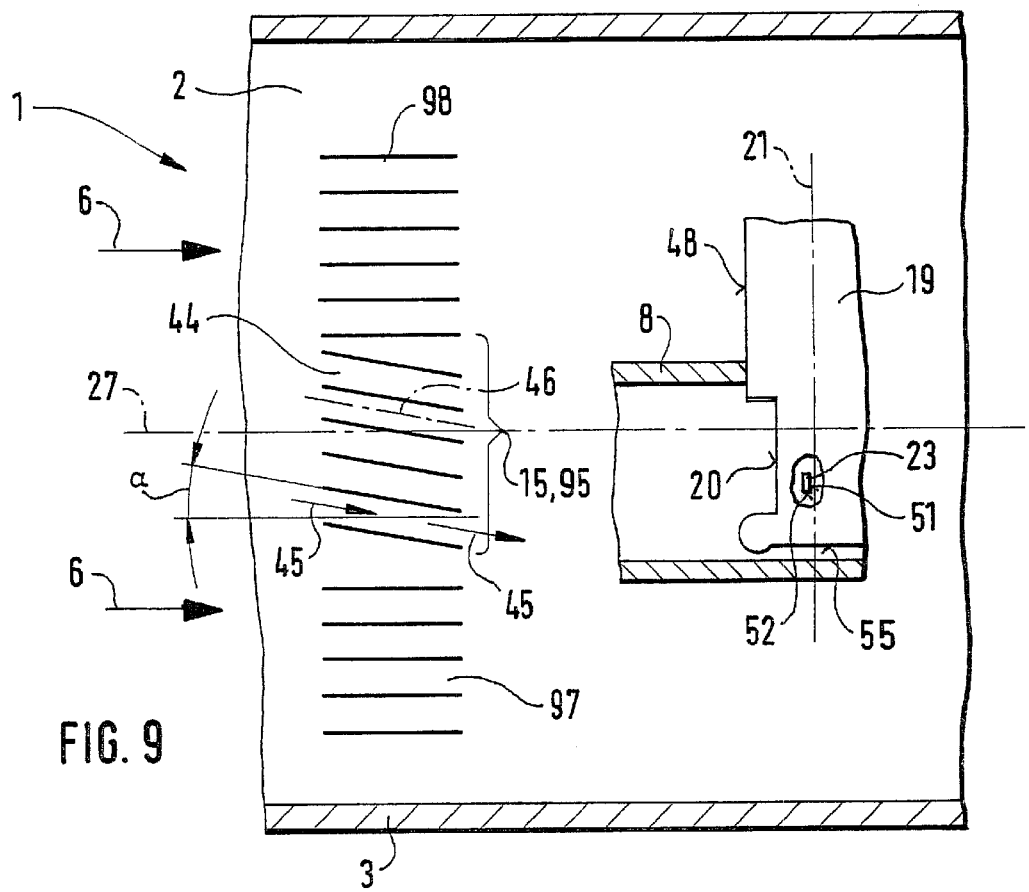
FIG. 9 shows an integration of the protective screen into a flow rectifier.

FIG. 9 shows how a protective screen 15, 95 is integrated into a rectifier 97 in a combination device 98. Parts which are the same or which function in the same manner are provided with the same reference numerals as in the preceding Figures.

The rectifier 97 is known to the specialist from DE 196 47 081 A1 and U.S. Pat. No. 5,918,279 and is incorporated into this disclosure.

FIG. 9 shows an axial cross section through the combination device 98. For example, the protective screen 15, 95 is incorporated into a radially inner region of the combination device 98. The center lines 46 there extend at a deflection angle α in relation to the center line 27 and thus constitute the protective screen 15 or the turbulence generator 95. For example in a radially outer region, i.e. in the vicinity of the wall 3 of the combination device 98, the center lines 46 extend parallel to the center line 27 and thus constitute the rectifier 97. The protective screen 15, 95 is disposed in the rectifier 97 so that for example an existing tubular body 8, the inlet opening 20, the recess 99, or the measuring element 23 is disposed downstream of the protective screen 15, 95 at virtually the same height as it.

Such a combination of rectifier 97 and protective screen 15, 95 can be produced, for example, by means of plastic injection molding.

Figure 10:
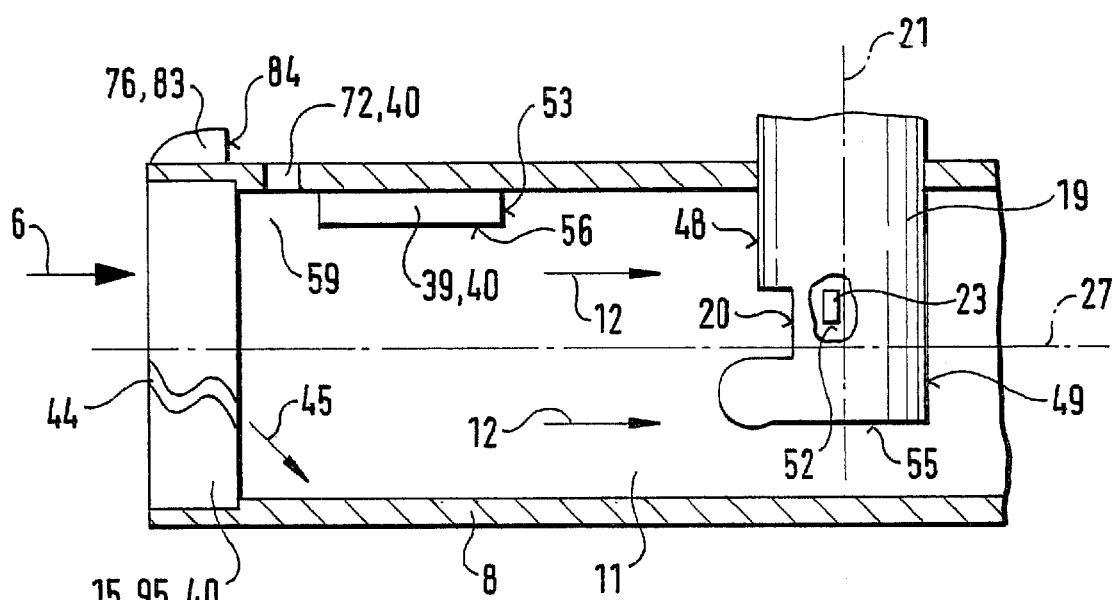
FIG. 10 shows another exemplary embodiment of a device according to the invention.

FIG. 10 shows ways in which the exemplary embodiments from FIGS. 2, 5, and 7 can be combined with one another. Parts which are the same or which function in the same manner are provided with the same reference numerals as in the preceding Figures.

For example, a turbulence generator 95 is used as the protective screen 15 in the tubular body 8. Likewise, at least one suction opening 72, for example, is disposed in the tubular body 8, with a corresponding projection 83. At least one longitudinal rib 39 is embodied here, for example not immediately downstream of the protective screen 15, 95, but just downstream of the suction opening 72. The at least one longitudinal rib 39 also does not extend to a front surface 48 of the measuring body 19.

Figure 11B:
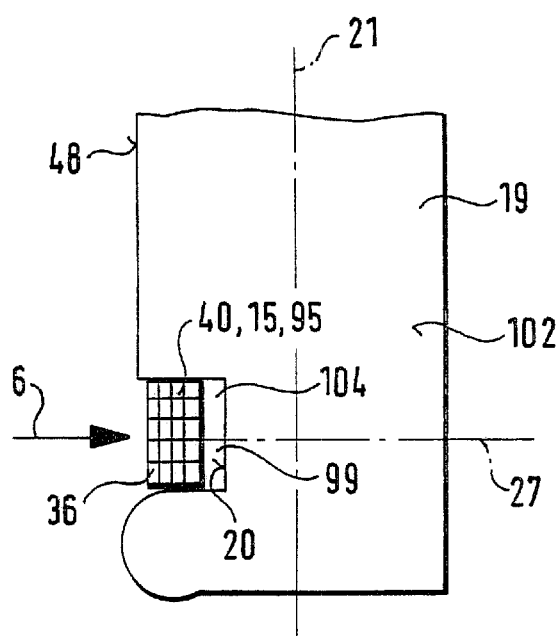
FIGS. 11a & 11b show a measuring body with the protective screen.
Figure 11A:
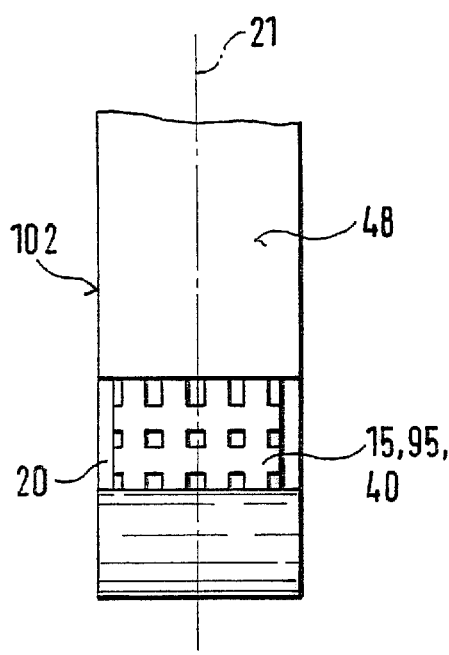

FIGS. 11a and 11b show a measuring body 19 with a protective screen 15, 95 in a front view (FIG. 11a) and side view (FIG. 11b). Parts which are the same or which function in the same manner are provided with the same reference numerals as in the preceding Figures.

The protective screen 15, 95 is disposed on the side oriented toward the flow in the main flow direction 6, in a recess 99 of the measuring body 19, in front of the inlet opening 20. The protective screen 15, 95 can be flush with the front surface 48 of the measuring body on the side oriented toward the flow. This is necessary, for example, if the measuring body 19 is slid, for example, into the line 2.

On the side oriented away from the flow, between the protective screen 15, 95 and the inlet opening 20, at least one opening 104 must remain open to an end wall 102 of the measuring body 19 in order to be able to deflect the fluid downstream of the protective screen 15, 95 against a side wall 102 of the measuring body 19.

The side wall 102 is a side surface of the measuring body 19, which extends virtually parallel to the main flow direction 6.

In order to assure favorable measurement properties of the measuring element 23, such as a low rate of pulsation error, low signal noise, and high reproducibility while simultaneously retaining unaltered response behavior, the slats 36 of the protective screen 15, 95 should have the following geometrical dimensions:

- a screen opening width of=0.1 mm horizontal to the main flow direction 6,
- a screen opening depth of=4 mm, i.e. the span in the axial direction along the main flow direction 6,
- a screen opening height adapted to the dimensions of the recess 99,
- screen openings 44 inclined, for example, by approximately 30°, the deflection angle α in relation to the main flow direction 6,
- the upstream edges of the slats 36 can be rectangular or quite rounded.

Because of the high demands on the geometry of the slats 36, e.g. very slight wall thicknesses, contouring of the slats 36, high-precision dimensions, the screen should be produced using micromechanics, for example the LIGA process or microgalvanizing.

The means for reducing eddies, such as longitudinal ribs, suction openings, and turbulence generators, can be combined with one another.

The foregoing relates to preferred exemplary embodiments of the invention, it being understood that other variants and embodiments thereof are possible within the spirit and scope of the invention, the latter being defined by the appended claims.

We claim:

1. A device (1) for measuring at least one parameter, in particular an air mass flow, of a medium flowing in a line (2), in particular the intake air mass flow of an internal combustion engine, the device having a measuring element disposed in the line (2) and which the flowing medium circulates around, the flowing medium having regions of flow, at least one of the regions of flow contacting on the measuring element, the improvement wherein the device (1) has at least one protective screen (15, 95), disposed at least partially upstream of the measuring element (23) inside the line (2) and which deflects the medium flowing in a main flow direction (6) downstream of the protective screen (15, 95), so that dirt particles and liquid droplets entrained by the flowing medium are diverted downstream of the protective screen (15, 95) into a region of the flowing medium which does not contact the measuring element (23).

2. The device according to claim 1, wherein, inside the line (2), the device (1) has means (40) for reducing eddies (87) and uncontrollable fluid accumulations downstream of the protective screen (15, 95) or in the protective screen (15, 95).

3. The device according to claim 2, wherein, as the means (40) for reducing eddies (87) and fluid accumulations, the protective screen (15, 95) is embodied so that it sets the flowing medium into a twisting motion.

4. The device according to claim 3, wherein the protective screen (15, 95) has screen openings (44) which constitute a turbulence generator (95) as the means (40) for reducing eddies (87) and fluid accumulations.

5. The device according to claim 1, wherein screen openings (44) of the protective screen (15, 95) have center lines (46), which are inclined in relation to the main flow direction (6) after installation of the protective screen (15, 95).

6. The device according to claim 1, wherein, the protective screen (15, 95) is inclined in relation to the main flow (6).

7. The device according to claim 1, wherein, the line (2) contains a tubular body (8) which has a through flow conduit (11) and is flowed through by the medium in the main flow direction (6), the measuring element (23) being disposed in the tubular body (8).

8. The device according to claim 7, wherein the protective screen (15, 95) is disposed directly upstream of the tubular body (8) or inside it.

9. The device according to claim 1, wherein, as a means (40) for reducing eddies (87) and fluid accumulations, at least one longitudinal rib (39) aligned in the main flow direction (6) is affixed to a tubular body (8) or in the line (2), said tubular body (8) is arranged in the line (2) and has a through flow conduit (11) in the region where the medium flows.

10. The device according to claim 9, wherein the deflection of the medium in the line (2) or the tubular body (8) downstream of the protective screen (15, 95) produces a protective region (59) of the flow, the at least one longitudinal rib (39) being predominantly disposed in said protective region (59).

11. The device according to claim 9, wherein said at least one longitudinal rib (39) has a width, said width being defined by the expansion of at least one longitudinal rib (39) in a circumference direction of the line (2), and that the width of the at least one longitudinal rib (39) becomes larger in the downstream direction.

12. The device according to claim 9, wherein the at least one longitudinal rib (39) is embodied as streamlined in the main flow direction (36).

13. The device according to claim 9, wherein the at least one longitudinal rib (39) is free of any geometrically uneven areas.

14. The device according to claim 9, wherein the line (2) or the tubular body (8) has a center line (27), wherein the longitudinal rib (39) has a radial rib center line (63) which extends perpendicular to the center line (27), and wherein the radial rib center line (63) intersects the center line (27) of the line (2) or the body (8).

15. The device according to claim 14, wherein a rib defining flow line (57), which extends parallel to the center line (27) of the line (2) or tubular body (8) and tangential to an end (56) of the radial span of the at least one longitudinal rib (39), is at most tangential to a bottom surface (52) of the measuring element (23) protruding into the line (2) or tubular body (8).

16. The device according to claim 14, wherein an intersecting angle ($\alpha$) of the radial rib center line (63) of directly adjacent longitudinal ribs (39) is of a uniform magnitude.

17. The device according to claim 9, wherein the radial height (58) of the at least one longitudinal rib (39) increases the flow direction (6, 12).

18. The device according to claim 9, wherein the radial height (58) of the at least one longitudinal rib (39) decreases the flow direction (6, 12).

19. The device according to claim 9, wherein the measuring element (23) is disposed in a measuring body (19) and that a rib defining flow line (57), which extends parallel to the center line (27) of the line (2) or tubular body (8) and tangential to an end (56) of the radial span of the at least one longitudinal rib (39), is at most tangential to a bottom surface (55) of the measuring element (19) protruding into the line (2) or tubular body (8).

20. The device according to claim 9, wherein the measuring element (23) or a measuring body (19) has a rear surface (49), which extends perpendicular to the center line (27) and is disposed at the furthest point downstream, and that at most, the at least one longitudinal rib (39) extends to the downstream rear surface (49) of the measuring element (23) or the measuring body (19) in which the measuring element (23) is arranged.

21. The device according to claim 9, wherein, in the circumference direction of the line (2), there is a uniform distance between directly adjacent ribs (39).

22. The device according to claim 9, wherein said tubular body (8) includes at least one suction opening (72) as a means (40) for reducing eddies (87) and accumulations of fluid in the tubular body (8).

23. The device according to claim 22, wherein the at least one suction opening (72) is disposed in a wall of the tubular body (8) and produces a connection between protected region (59) in the tubular body (8) and the line (2).

24. The device according to claim 22, wherein a position of the at least one suction opening (72) on the tubular body (8) depends on the degree of deflection of the medium downstream of the protective screen (15, 95) defined by a deflection angle ($\alpha$).

25. The device according to claim 22, wherein, upstream in the vicinity of opening (72), a means (76) for increasing the flow speed of the medium is affixed to the tubular body (8) or the opposing side to an inner wall (7) of the line (2).

26. The device according to claim 25, wherein the means (76) for increasing the flow speed in the course of the main flow direction (6) produces a convergent conduit (79) and is rounded in the direction oriented counter to the main flow direction (6).

27. The device according to claim 1, wherein a rectifier (97) is disposed in the line (2) upstream of the measuring element (23), and said protective screen (15, 95) being integrated into the rectifier (97).

28. The device according to claim 27, wherein the measuring element (23) is disposed in a measuring conduit of a measuring body (19), said measuring body (19) having an inlet opening (20) and an outlet opening of the measuring conduit, said protective screen (15, 95) being integrated into the rectifier (97) upstream, at the level of the measuring element (23) or the inlet opening (20).

29. The device according to claim 28, wherein the measuring body (19) has a recess (99) upstream in the vicinity of the inlet opening (20) and wherein the protective screen (15, 95) is affixed in the recess (99).

30. The device according to claim 29, wherein the measuring body (19) has at least two side walls (102), which extend virtually parallel to the main flow direction (6), and wherein there is an opening (104) immediately between a downstream end of the protective screen (15, 95) and the side wall (102).

31. The device according to claim 29, wherein the protective screen (15, 95) is manufactured using a microtechnological process.

32. The device according to claim 31, wherein the protective screen (15, 95) is manufactured using a LIGA process or microgalvanization.

33. The device according to claim 1, wherein the protective screen (15, 95) is manufactured from plastic.

34. A device (1) for measuring at least one parameter, in particular an air mass flow, of a medium flowing in a line (2), in particular the intake air mass flow of an internal combustion engine, the device having a measuring element disposed in the line (2) and which the flowing medium circulates around, the flowing medium having regions of flow, at least one of the regions of flow contacting on the measuring element, the improvement wherein the device (1)

has at least one protective screen (15, 95), disposed at least partially upstream of the measuring element (23) inside the line (2) and which deflects the medium flowing in a main flow direction (6) downstream of the protective screen (15, 95), so that dirt particles and liquid droplets entrained by the flowing medium are diverted downstream of the protective screen (15, 95) into a region of the flowing medium which does not contact the measuring element (23), wherein, inside the line (2), the device (1) has means (40) for reducing eddies (87) and uncontrollable fluid accumulations downstream of the protective screen (15, 95) or in the protective screen (15, 95).

35. A device (1) for measuring at least one parameter, in particular an air mass flow, of a medium flowing in a line (2), in particular the intake air mass flow of an internal combustion engine, the device having a measuring element disposed in the line (2) and which the flowing medium circulates around, the improvement wherein the device (1) has at least one protective screen (15, 95), disposed at least partially upstream of the measuring element (23) inside the line (2) and which deflects the medium flowing in a main flow direction (6) downstream of the protective screen (15, 95), so that dirt particles and liquid droplets entrained in the flowing medium are diverted downstream of the protective screen (15, 95) into a region of the flowing medium which does not come in contact with the measuring element (23).

\* \* \* \* \*